(12) United States Patent
Kawate et al.

(10) Patent No.: US 10,300,681 B2
(45) Date of Patent: May 28, 2019

(54) INTERMEDIATE FILM FOR LAMINATED GLASS, METHOD FOR PRODUCING INTERMEDIATE FILM FOR LAMINATED GLASS, AND LAMINATED GLASS

(71) Applicant: SEKISUI CHEMICAL CO., LTD., Osaka-shi, Osaka (JP)

(72) Inventors: Hiroshi Kawate, Shiga (JP); Koji Kido, Shiga (JP); Shougo Yoshida, Shiga (JP); Michiko Mori, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/580,868

(22) PCT Filed: Jul. 29, 2016

(86) PCT No.: PCT/JP2016/072397
§ 371 (c)(1),
(2) Date: Dec. 8, 2017

(87) PCT Pub. No.: WO2017/022686
PCT Pub. Date: Feb. 9, 2017

(65) Prior Publication Data
US 2018/0162105 A1 Jun. 14, 2018

(30) Foreign Application Priority Data
Jul. 31, 2015 (JP) .................. 2015-152798

(51) Int. Cl.
*B32B 3/30* (2006.01)
*B60J 1/02* (2006.01)
(Continued)

(52) U.S. Cl.
CPC ...... *B32B 17/10587* (2013.01); *B29C 48/002* (2019.02); *B29C 48/08* (2019.02);
(Continued)

(58) Field of Classification Search
CPC ........ B32B 17/10587; B32B 17/10761; B32B 3/30; B32B 17/10; B32B 2605/006;
(Continued)

(56) References Cited

U.S. PATENT DOCUMENTS 4,654,179 A * 3/1987 Cartier .............. B32B 17/10577
264/176.1
5,595,818 A * 1/1997 Hopfe ............... B32B 17/10577
264/176.1
(Continued)

FOREIGN PATENT DOCUMENTS

EP   3 029 000   6/2016
EP   3 029 001   6/2016
(Continued)

OTHER PUBLICATIONS

International Search Report dated Oct. 11, 2016 in International (PCT) Application No. PCT/JP2016/072397.
(Continued)

*Primary Examiner* — Jeffrey M Wollschlager
(74) *Attorney, Agent, or Firm* — Wenderoth, Lind & Ponack, L.L.P.

(57) ABSTRACT

The present invention aims to provide an interlayer film for a laminated glass which enables production of a laminated glass with suppressed occurrence of optical distortion, a method for producing the interlayer film for a laminated glass, and a laminated glass produced using the interlayer film for a laminated glass. The present invention relates to an interlayer film for a laminated glass produced by an extrusion lip embossing method utilizing melt fracture, the interlayer film for a laminated glass including a laminate that includes two or more resin layers in a stack and having a large number of protrusions and recesses on at least one surface, a maximum height Ry (μm) and an average interval Sm (μm) of the protrusions and recesses measured in con-
(Continued)

formity with JIS B 0601 (1994) on the surface with protrusions and recesses satisfying a formula (1):

$$(Ry \times Sm)/2 \leq 3{,}500 \quad (1).$$

1 Claim, 3 Drawing Sheets

(51) Int. Cl.
| | |
|---|---|
| *B29C 48/00* | (2019.01) |
| *B29C 48/08* | (2019.01) |
| *B29C 48/21* | (2019.01) |
| *B29C 48/88* | (2019.01) |
| *B29C 59/02* | (2006.01) |
| *B29K 29/00* | (2006.01) |
| *B29L 31/30* | (2006.01) |
| *B32B 17/10* | (2006.01) |

(52) U.S. Cl.
CPC ............ *B29C 48/21* (2019.02); *B32B 3/30* (2013.01); *B32B 17/10596* (2013.01); *B32B 17/10761* (2013.01); *B29C 48/919* (2019.02); *B29C 59/022* (2013.01); *B29C 59/026* (2013.01); *B29C 2059/023* (2013.01); *B29K 2029/14* (2013.01); *B29L 2031/3052* (2013.01); *B32B 2605/006* (2013.01); *B60J 1/02* (2013.01)

(58) Field of Classification Search
CPC ............ B29C 47/0061; B29C 47/065; B29C 47/0021; B29C 47/06; B29C 47/88; B29C 47/8895; B29C 59/022; B29C 59/026; B29C 2059/023; B60J 1/00; B60J 1/02; B29K 2029/14; B29L 2031/3052
See application file for complete search history.

(56) References Cited

U.S. PATENT DOCUMENTS

| | | | | |
|---|---|---|---|---|
| 2003/0012964 | A1* | 1/2003 | Choi | B32B 17/10577 428/437 |
| 2004/0191482 | A1* | 9/2004 | Nakajima | B29C 59/022 428/156 |
| 2006/0263608 | A1* | 11/2006 | Choi | B32B 3/26 428/426 |
| 2007/0231550 | A1* | 10/2007 | Stenzel | B29C 59/04 428/172 |
| 2008/0157426 | A1* | 7/2008 | Kotwis | B29C 47/0021 264/211.12 |
| 2008/0254302 | A1* | 10/2008 | Bourcier | B29C 47/0021 428/437 |
| 2008/0268204 | A1 | 10/2008 | Bourcier | |
| 2011/0094665 | A1* | 4/2011 | Bourcier | B29C 47/0021 156/244.11 |
| 2012/0135191 | A1* | 5/2012 | Spangler | B29C 59/04 428/141 |
| 2015/0174862 | A1* | 6/2015 | Kitano | B32B 27/08 428/186 |
| 2017/0015082 | A1* | 1/2017 | Creytens | B32B 3/30 |

FOREIGN PATENT DOCUMENTS

| | | |
|---|---|---|
| EP | 3 029 003 | 6/2016 |
| JP | 6-210729 | 8/1994 |
| JP | 8-26789 | 1/1996 |
| JP | 2000-203901 | 7/2000 |
| JP | 2003-48762 | 2/2003 |
| JP | 2003-528749 | 9/2003 |
| JP | 2009-190947 | 8/2009 |
| JP | 2010-523379 | 7/2010 |
| JP | 2014-501641 | 1/2014 |
| JP | 2015-59052 | 3/2015 |
| WO | 2008/128003 | 10/2008 |
| WO | 2012/074702 | 6/2012 |
| WO | 2014/021459 | 2/2014 |
| WO | 2015/016361 | 2/2015 |
| WO | 2015/016365 | 2/2015 |
| WO | 2015/016366 | 2/2015 |

OTHER PUBLICATIONS

Extended European Search Report dated Feb. 13, 2019 in corresponding European Application No. 16832965.4.

* cited by examiner

INTERMEDIATE FILM FOR LAMINATED GLASS, METHOD FOR PRODUCING INTERMEDIATE FILM FOR LAMINATED GLASS, AND LAMINATED GLASS

TECHNICAL FIELD

The present invention relates to an interlayer film for a laminated glass which enables production of a laminated glass with suppressed occurrence of optical distortion, a method for producing the interlayer film for a laminated glass, and a laminated glass produced using the interlayer film for a laminated glass.

BACKGROUND ART

A laminated glass including two glass plates integrated through an interlayer film for a laminated glass containing plasticized polyvinyl butyral is widely used, particularly, for vehicle windshields.

In a method for producing a laminated glass, for example, an interlayer film for a laminated glass unwound from a rolled body is cut into an appropriate size, and the resulting interlayer film for a laminated glass is sandwiched between at least two glass plates. The obtained laminate is placed in a rubber bag and vacuum suctioned so that the glass plates and the interlayer film are preliminarily pressure-bonded while air remaining therebetween is removed. Then, the laminate is pressurized with heat, for example, in an autoclave, to be finally pressure-bonded (e.g., Patent Literature 1).

In the production process of a laminated glass, deaeration properties upon lamination of a glass plate and an interlayer film for a laminated glass in preliminary pressure bonding are important. The interlayer film for a laminated glass therefore has a large number of protrusions and recesses on at least one surface thereof to ensure deaeration properties in the production of a laminated glass. Recently, an extrusion lip embossing method utilizing melt fracture has been employed for forming such protrusions and recesses (e.g., Patent Literature 2).

Protrusions and recesses formed on a surface of an interlayer film for a laminated glass are crushed upon pressure bonding of a glass plate and an interlayer film for a laminated glass after stacking thereof in the process from preliminary pressure bonding to final pressure bonding. They therefore are hardly visible in the obtained laminated glass. However, the protrusions and recesses sometimes cause optical distortion in the obtained laminated glass. In particular, in the case where the interlayer film for a laminated glass is formed of a laminate that includes two or more resin layers, occurrence of optical distortion is remarkable. The optical distortion of a laminated glass herein refers to a phenomenon where an object observed through a laminated glass looks distorted.

For reducing the optical distortion of a laminated glass, a method of controlling the pattern of protrusions and recesses on a surface of an interlayer film for a laminated glass has been employed (e.g., Patent Literature 3). In actuality, however, it is difficult to sufficiently prevent occurrence of optical distortion. Even when the optical distortion is reduced to the extent that the front view is visible without any difficulty, the optical distortion may remain to cause flickering of signals or pedestrian crossings.

CITATION LIST

Patent Literature

Patent Literature 1: JP H08-26789 A
Patent Literature 2: JP 2010-523379 T
Patent Literature 3: JP 2009-190947 A

SUMMARY OF INVENTION

Technical Problem

The present invention aims to provide, in consideration of the state of the art, an interlayer film for a laminated glass that enables production of a laminated glass with suppressed occurrence of optical distortion, a method for producing the interlayer film for a laminated glass, and a laminated glass produced using the interlayer film for a laminated glass.

Solution to Problem

The present invention relates to an interlayer film for a laminated glass produced by an extrusion lip embossing method utilizing melt fracture, the interlayer film for a laminated glass including a laminate that includes two or more resin layers in a stack and having a large number of protrusions and recesses on at least one surface, a maximum height Ry (μm) and an average interval Sm (μm) of the protrusions and recesses measured in conformity with JIS B 0601 (1994) on the surface with protrusions and recesses satisfying a formula (1):

$$(Ry \times Sm)/2 \leq 3{,}500 \tag{1}$$

The present invention is specifically described in the following.

The present inventors studied about the reason why occurrence of optical distortion cannot be sufficiently prevented even in a case where the pattern of protrusions and recesses is controlled upon formation of the protrusions and recesses on a surface by an extrusion lip embossing method utilizing melt fracture in an interlayer film for a laminated glass formed of a laminate that includes two or more resin layers. As a result, they found out that, even in the case where the pattern of protrusions and recesses is controlled at the stage of an interlayer film for a laminated glass, the optical distortion is aggravated by heating and pressurization in production of a laminated glass.

The present inventors made further intensive studies to find out that a laminated glass with sufficiently suppressed occurrence of optical distortion can be obtained by controlling the maximum height Ry and the average interval Sm of protrusions and recesses on a surface of an interlayer film for a laminated glass to satisfy a predetermined relation. The present invention was thus completed.

The interlayer film for a laminated glass of the present invention has a large number of protrusions and recesses on at least one surface. With this structure, deaeration properties during production of a laminated glass can be ensured.

The interlayer film for a laminated glass of the present invention may have the protrusions and recesses only on one surface or both surfaces. Preferably, the protrusions and recesses are formed on both surfaces to exhibit excellent deaeration properties during the production of a laminated glass.

In the interlayer film for a laminated glass of the present invention, the maximum height Ry (μm) and the average interval Sm (μm) of the protrusions and recesses each measured in conformity with JIS B 0601 (1994) satisfy the above formula (1) on the surface having the protrusions and recesses.

FIG. 1 shows a schematic view explaining the meaning of "$(Ry \times Sm)/2$" in the above formula (1). In FIG. 1, protrusions and recesses 1 on a surface of an interlayer film for a laminated glass include a protrusion 11 and a recess 12.

The maximum height Ry is a parameter relating to the height direction of the protrusions and recesses and substantially corresponds to the height of the protrusions and recesses in FIG. 1. When the maximum height Ry is smaller, distortion at the interface between a glass plate and the interlayer film for a laminated glass is smaller, which tends to reduce optical distortion. The average interval Sm of the projections and recesses is a parameter relating to the width of a recess or a protrusion of the protrusions and recesses, and means the interval between adjacent protrusions 11 in FIG. 1. When the average interval Sm is smaller, distortion at the interface between a glass plate and the interlayer film for a laminated glass is smaller, which tends to reduce optical distortion.

The value of "$(Ry \times Sm)/2$" substantially corresponds to the area of a triangle indicated by a shaded portion in FIG. 1. The area of a region surrounded by two adjacent protrusions 11 and a recess 12 between the two adjacent protrusions 11 among the protrusions and recesses on the surface of the interlayer film for a laminated glass is similar to the area of the triangle. By setting the area of the triangle, i.e., the value of "$(Ry \times Sm)/2$", to 3,500 or less, occurrence of optical distortion can be prevented. For further prevention of occurrence of optical distortion, the value of "$(Ry \times Sm)/2$" is preferably 3,000 or less, more preferably 2,700 or less (in other words, $(Ry \times Sm)/2 \leq 2,700$ (2) is more preferably satisfied), still more preferably 2,500 or less, particularly preferably 2,300 or less, most preferably 2,000 or less.

The lower limit of the value of "$(Ry \times Sm)/2$" is not particularly limited. For achieving sufficient deaeration properties in production of a laminated glass, the value is preferably 1,000 or more, more preferably 1,500 or more.

The value of the maximum height Ry is not particularly limited, provided that the value of "$(Ry \times Sm)/2$" is 3,500 or less. The lower limit of the value is preferably 10 μm and the upper limit thereof is preferably 25 μm. With the value of the maximum height Ry within this range, high deaeration properties can be exhibited while occurrence of optical distortion is prevented. The lower limit of the maximum height Ry is more preferably 13 μm and the upper limit thereof is more preferably 22 μm. The lower limit is still more preferably 15 μm and the upper limit is still more preferably 20 μm.

The maximum height Ry can be measured using "Surfcorder SE300" available from Kosaka Laboratory Ltd. as a measuring instrument, for example, under the following conditions of a stylus profilometer: a cut-off value of 2.5 mm, a standard length of 2.5 mm, an evaluation length of 12.5 mm, a tip radius of a stylus of 2 μm, a tip angle of the stylus of 60°, and a measurement rate of 0.5 mm/s. The measurement environment is set to 23° C. and 30 RH %, and the stylus is moved in a direction parallel to the machine direction of the sheet.

The specifications of the protrusions and recesses on the surface include, in addition to Ry, the groove depth (Rzg) of the recess, the ten-point average roughness Rz, and the like. These specifications measured even on the same surface show different values, having no relation therebetween. The groove depth (Rzg) of the recess refers to the average value based on the groove depths of the number of the measured grooves. The groove depths are calculated based on the average line of the roughness curve (a line set to minimize the sum of the squares of deviations from the line to the roughness curve) as specified in JIS B-0601 (1994) "Surface roughness—definition and indications". For example, the groove depth (Rzg) of the recess can be easily obtained by data processing of digital signals measured using a surface profilometer ("SE1700α" available from Kosaka Laboratory Ltd.). The ten-point average roughness can be measured in conformity with JIS B0601-1982.

The value of the average interval Sm of the protrusions and recesses is not particularly limited as long as the value of "$(Ry \times Sm)/2$" is 3,500 or less. The lower limit of the value is preferably 140 μm and the upper limit thereof is preferably 408 μm. With the value of the average interval Sm of the protrusions and recesses within this range, high deaeration properties can be exhibited while occurrence of optical distortion is prevented. The lower limit of the value of the average interval Sm of the protrusions and recesses is more preferably 159 μm and the upper limit thereof is more preferably 350 μm. The lower limit is still more preferably 175 μm and the upper limit is still more preferably 269 μm. The upper limit is particularly preferably 233 μm.

The average interval Sm of the protrusions and recesses can be measured using "Surfcorder SE300" available from Kosaka Laboratory Ltd. as a measuring instrument under the following conditions of a stylus profilometer: a cut-off value of 2.5 mm, a standard length of 2.5 mm, an evaluation length of 12.5 mm, a tip radius of a stylus of 2 μm, a tip angle of the stylus of 60°, and a measurement rate of 0.5 mm/s. The measurement environment is set to 23° C. and 30 RH %.

The pattern of protrusions and recesses is provided by an extrusion lip embossing method utilizing melt fracture.

The melt fracture is a phenomenon that, during the molding by extruding a molten resin from a die, a surface of a molded article ripples when the shearing stress at an outlet of the die exceeds a certain critical value. Protrusions and recesses can be provided to the surface of the interlayer film for a laminated glass by controlling the melt fracture.

For providing protrusions and recesses with the value of "$(Ry \times Sm)/2$" of 3,500 or less, in the extrusion lip embossing method utilizing melt fracture, the resin pressure at an inlet of a die, a resin temperature, a die temperature, a width of an outlet of the die, an extrusion amount per width of the outlet of the die, a film surface temperature immediately after ejection from the outlet of the die, a distance from the outlet of the die to a cooling water tank, a water temperature in the cooling water tank, and the like are controlled. For example, when the resin temperature or die temperature increases, the maximum height Ry is decreased. When the width of the outlet of the die is narrowed, the average interval Sm of the protrusions and recesses is decreased. The resin temperature refers to a temperature of the resin at the inlet of the die. Ry can be decreased also by increasing the resin pressure at the inlet of the die, increasing the extrusion amount per width of the outlet of the die, increasing the film surface temperature immediately after ejection from the outlet of the die, increasing the distance from the outlet of the die to the cooling water tank, increasing the water temperature in the cooling water tank, or the like. In contrast, the average interval Sm can be increased by increasing the resin pressure at the inlet of the die, increasing the extrusion amount per width of the outlet of the die, increasing the film surface temperature immediately after ejection from the outlet of the die, increasing the distance from the outlet of the die to the cooling water tank, increasing the water temperature in the cooling water tank, or the like.

More specifically, the protrusions and recesses with the value of "(Ry×Sm)/2" of 3,500 or less are provided by controlling the resin pressure at the inlet of the die within a range of 40 to 150 kgf/cm², the resin temperature within a range of 160° C. to 250° C., the die temperature within a range of 100° C. to 270° C., the width of the outlet of the die within a range of 700 to 3,500 mm, the extrusion amount per width of the outlet of the die within a range of 130 to 1,700 kg/hr·m, the film surface temperature immediately after ejection from the outlet of the die within a range of 170° C. to 250° C., the distance from the outlet of the die to the cooling water tank within a range of 10 to 400 mm, and the water temperature in the cooling water tank within a range of 10° C. to 70° C.

The present invention also encompasses a method for producing the interlayer film for a laminated glass of the present invention, including a step of providing a large number of protrusions and recesses on at least one surface of an interlayer film for a laminated glass by an extrusion lip embossing method utilizing melt fracture, the step including coextrusion of resins from a co-extruder under the following conditions: a resin pressure at an inlet of a die of 40 to 150 kgf/cm², a resin temperature of 160° C. to 250° C., a die temperature of 100° C. to 270° C., a width of an outlet of the die of 700 to 3,500 mm, an extrusion amount per width of the outlet of the die of 130 to 1,700 kg/hr·m, a film surface temperature immediately after ejection from the outlet of the die of 170° C. to 250° C., a distance from the outlet of the die to a cooling water tank of 10 to 400 mm, and a water temperature in the cooling water tank of 10° C. to 70° C.

The interlayer film for a laminated glass of the present invention may be further provided with a large number of recesses each having a groove shape with a continuous bottom (hereafter, also referred to as "second shape") on at least one surface as recesses larger than the protrusions and recesses with the value of "(Ry×Sm)/2" of 3,500 or less (hereafter, also referred to as "first shape" for making a distinction). With such a second shape, deaeration properties during the production of a laminated glass can be further improved.

The recesses of the second shape may be of any shape as long as they each have a shape with a continuous bottom (groove shape). For example, the shape of the recesses may be one that is commonly formed on a surface of an interlayer film for a laminated glass, such as a shape of an engraved line or a grid pattern (e.g., blockish pattern, spherical pattern). The recesses may have a shape transferred from an embossing roll.

Preferably, the recesses of the second shape each have a groove shape with a continuous bottom, and adjacent recesses are regularly parallel to each other (hereinafter, also referred to as "in the shape of engraved lines"). Commonly, ease of deaeration upon pressure bonding of a laminate including an interlayer film for a laminated glass interposed between two glass plates closely relates to the continuousness and smoothness of the bottoms of the recesses. When the recesses are in the shape of engraved lines, the continuousness of the bottoms is further improved to markedly increase the deaeration properties.

The term "regularly parallel" means that adjacent recesses each having the groove shape mentioned above may be parallel to each other at equal intervals, or adjacent recesses in the shape of engraved lines are parallel to each other, but all of adjacent recesses in the shape of engraved lines are not necessarily parallel to each other at equal intervals.

FIG. 2 and FIG. 3 each show a schematic view of an exemplary interlayer film for a laminated glass in which groove-shaped recesses are parallel to each other at equal intervals. FIG. 4 is a schematic view of an exemplary interlayer film for a laminated glass in which groove-shaped recesses are parallel to each other at unequal intervals. In FIG. 4, an interval A between a recess 21 and a recess 22 is different from an interval B between a recess 21 and a recess 23.

Further, FIG. 5 shows a schematic view of an exemplary interlayer film for a laminated glass, having a blockish pattern on a surface. FIG. 6 shows a schematic view of an exemplary interlayer film for a laminated glass, having a spherical pattern on a surface.

The lower limit of the maximum height Ry of the recesses of the second shape, measured in conformity with JIS B 0601 (1994), is 10 µm and the upper limit thereof is preferably 75 µm. With the maximum height Ry of the second shape of 10 µm or more, remarkably excellent deaeration properties can be exhibited. With the maximum height Ry of the second shape of 75 µm or less, recesses are easily crushed upon pressure bonding of the interlayer film for a laminated glass interposed between two glass plates, which allows reduction in temperature for the pressure bonding. The lower limit of the maximum height Ry of the second shape is more preferably 15 µm and the upper limit thereof is more preferably 50 µm. The lower limit is still more preferably 25 µm and the upper limit is still more preferably 40 µm.

In a case where the recesses of the second shape each have a groove shape with a continuous bottom and adjacent recesses are regularly parallel to each other, the interval Sm between the recesses in the shape of engraved lines is preferably 400 µm or less, more preferably 200 µm or less, still more preferably 150 µm or less. The lower limit thereof is preferably 80 µm.

When the recesses of the second shape each have a groove shape with a continuous bottom and adjacent recesses are regularly parallel to each other and when the recesses of the second shape are formed on both surfaces of an interlayer film for a laminated glass, an intersection angle θ between the recesses each having a groove shape with a continuous bottom on one surface and the recesses each having a groove shape with a continuous bottom on the other surface is preferably 10° or more. In this case, adhesion (autohesion) of the interlayer films for a laminated glass in a stack during storage can be prevented. The intersection angle θ is more preferably 20° or more, still more preferably 45° or more, particularly preferably 90°.

For the intersection angle θ, for example, an interlayer film for a laminated glass is visually or optical-microscopically observed to measure the intersection angle θ between the recesses each having a groove shape with a continuous bottom on the first surface and the recesses each having a groove shape with a continuous bottom on the second surface. In the case of visual observation, straight lines are drawn in ink in parallel to the recesses on both surfaces, and an acute angle between the drawn straight lines is measured with a protractor. In the case of optical microscopic observation, an enlarged surface is photographed and an acute angle is measured using image processing software or the like. Thus, the intersection angle θ can be measured.

The protrusions formed correspondingly to the recesses of the second shape each may have a flat top or a non-flat top. In the case where the protrusions each have a flat top, the flat surface of the top may further have fine protrusions and recesses.

Further, in the protrusions and recesses, the protrusions may have the same or different heights, and the recesses may have the same or different depths as long as the recesses each have a continuous bottom.

The protrusions each preferably have a radius of rotation R of 200 μm or less, more preferably 100 μm or less, still more preferably 40 μm or less, particularly preferably 25 μm or less. Thus, the adhesion force (autohesion) between the interlayer films for a laminated glass during storage in a stacked state can be further reduced.

The radius of rotation R of the protrusion can be measured as follows. For example, the interlayer film is cut in a direction perpendicular to the recesses in the shape of engraved lines and in the film thickness direction. The cross section is observed using a microscope (e.g., "DSX-100" available from Olympus Corporation) and photographed at a magnification of 277 times. The obtained image is enlarged to 50μ/20 mm. In this state, the radius of an inscribed circle at the apex of a protrusion shape is determined as the radius of rotation of the tip of the protrusion, using measurement software included in accessory software. The measurement environment is 23° C. and 30 RH %.

The method for forming the second shape is not particularly limited, and is performed by, for example, an embossing roll method, a calender roll method, or a profile extrusion method. In particular, preferred is the embossing roll method because the shape where adjacent recesses in the shape of engraved lines are parallel to each other is easily achieved.

The interlayer film for a laminated glass of the present invention preferably has a degree of shrinkage in the machine direction after immersion in warm water at 50° C. for 10 minutes of 4% or less. By controlling the degree of shrinkage to 4% or less in addition to the control of the protrusions and recesses on the surface of the interlayer film for a laminated glass as mentioned above, a laminated glass with sufficiently suppressed occurrence of optical distortion can be obtained even through heating and pressurization in the production of the laminated glass. The degree of shrinkage is more preferably 3% or less, still more preferably 1.5% or less.

The degree of shrinkage can be calculated as follows. An interlayer film for a laminated glass is cut into a rectangle as a measurement sample, and the measurement sample is immersed in warm water at 50° C. for 10 minutes. The length in the machine direction of the measurement sample is measured before and after the immersion, and the degree of shrinkage is calculated using the following equation.

Degree of shrinkage (%)=(length in machine direction after immersion)/(length in machine direction before immersion)×100

The machine direction of the interlayer film for a laminated glass as used herein refers to a direction in which a raw material resin composition is extruded from an extruder in the production of an interlayer film for a laminated glass.

The machine direction of the interlayer film for a laminated glass can be confirmed by the following method, for example. Namely, the machine direction is a parallel direction or a perpendicular direction of the film in which the degree of shrinkage is greater after storage of the interlayer film for a laminated glass in a constant-temperature bath at 140° C. for 30 minutes. The machine direction can be also confirmed based on the winding direction of a rolled body of the interlayer film for a laminated glass. The interlayer film for a laminated glass is wound into a rolled body in the machine direction of the film in the production of the interlayer film for a laminated glass, and therefore, the winding direction of the rolled body is the same as the machine direction of the film in the production of the interlayer film for a laminated glass.

The degree of shrinkage of the interlayer film for a laminated glass may be set to 4% or less by any method. Examples of the method include a method of decreasing the speed ratio in each step and between the steps and a method of releasing the internal stress by annealing.

The interlayer film for a laminated glass of the present invention includes a laminate in which two or more resin layers are stacked.

Due to the inclusion of a first resin layer and a second resin layer having different characteristics as two or more resin layers mentioned above, the interlayer film for a laminated glass of the present invention can have various properties which are hardly achieved by a single layer structure.

The resin layer preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer preferably contains a polyvinyl acetal or ethylene-vinyl acetate copolymer, more preferably contains a polyvinyl acetal.

The polyvinyl acetal can be prepared, for example, by acetalization of polyvinyl alcohol with an aldehyde. The polyvinyl alcohol can be produced, for example, by saponification of polyvinyl acetate. The polyvinyl alcohol commonly has a degree of saponification within a range of 70 to 99.8 mol %.

The polyvinyl alcohol has an average degree of polymerization of preferably 200 or more, more preferably 500 or more, still more preferably 1,700 or more, particularly preferably more than 1,700, and preferably 5,000 or less, more preferably 4,000 or less, still more preferably 3,000 or less, particularly preferably less than 3,000. When the average degree of polymerization is equal to or more than the lower limit, a laminated glass to be obtained has higher penetration resistance. When the average degree of polymerization is equal to or less than the upper limit, formation of an interlayer film is facilitated.

The average degree of polymerization of the polyvinyl alcohol can be obtained by the method in conformity with JIS K6726 "Testing methods for polyvinyl alcohol".

The carbon number of an acetal group contained in the polyvinyl acetal is not particularly limited. The aldehyde for use in production of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, an interlayer film has a sufficiently low glass transition temperature, and bleeding out of a plasticizer can be prevented. When the carbon number of the aldehyde is 6 or less, synthesis of the polyvinyl acetal can be facilitated to ensure the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are propionaldehyde, n-butyraldehyde, isobutyraldehyde, n-hexylaldehyde, and n-valeraldehyde, more preferred are propionaldehyde, n-butyraldehyde, and isobutyraldehyde, and still more preferred is n-butyraldehyde. These aldehydes may be used alone or in combination of two or more thereof.

The hydroxy group content of the polyvinyl acetal is preferably 10 mol % or more, more preferably 15 mol % or more, still more preferably 18 mol % or more, and preferably 40 mol % or less, more preferably 35 mol % or less. When the hydroxy group content is equal to or more than the lower limit, an interlayer film has a higher adhesion force. When the hydroxy group content is equal to or less than the upper limit, an interlayer film has high flexibility and is easily handled.

The hydroxy group content of the polyvinyl acetal is a value in percentage of the mole fraction obtained by dividing the amount of ethylene groups to which hydroxy groups are bonded by the total amount of ethylene groups of the main chain. The amount of ethylene groups to which hydroxy groups are bonded can be determined, for example, by measurement in conformity with JIS K6726 "Testing methods for polyvinyl alcohol" or in conformity with ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has high compatibility with a plasticizer. When the degree of acetylation is equal to or less than the upper limit, an interlayer film and a laminated glass to be obtained have high damp resistance.

The degree of acetylation is a value in percentage of the mole fraction obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be measured, for example, in conformity with JIS K6728 "Testing methods for polyvinyl butyral" or in conformity with ASTM D1396-92.

The degree of acetalization of the polyvinyl acetal (or the degree of butyralization of a polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has high compatibility with a plasticizer. When the degree of acetalization is equal to or less than the upper limit, a reaction time necessary for production of the polyvinyl acetal is reduced.

The degree of acetalization is a value in percentage of the mole fraction obtained by dividing the amount of ethylene groups to which acetal groups are bonded by the total amount of ethylene groups of the main chain.

The degree of acetalization can be calculated by measuring the degree of acetylation and the hydroxy group content by the method in conformity with JIS K6728 "Testing methods for polyvinyl butyral" or the method in conformity with ASTM D1396-92, calculating their mole fractions from the obtained measurement results, and subsequently subtracting the mole fractions of the degree of acetylation and the hydroxy group content from 100 mol %.

The hydroxy group content, the degree of acetalization (degree of butyralization), and the degree of acetylation are preferably calculated from the results of measurement by the method in conformity with JIS K6728 "Testing methods for polyvinyl butyral". In the case where the polyvinyl acetal is a polyvinyl butyral resin, the hydroxy group content, the degree of acetalization (degree of butyralization), and the degree of acetylation are preferably calculated from the results of measurement by the method in conformity with JIS K6728 "Testing methods for polyvinyl butyral".

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The plasticizer content is not particularly limited. Yet, the plasticizer content based on 100 parts by mass of the thermoplastic resin is preferably 25 parts by mass or more, more preferably 30 parts by mass or more, and preferably 80 parts by mass or less, more preferably 70 parts by mass or less. When the plasticizer content is equal to or more than the lower limit, a laminated glass to be obtained has higher penetration resistance. When the plasticizer content is equal to or less than the upper limit, an interlayer film has higher transparency.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The resin layer to be in contact with a glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The thickness of the interlayer film for a laminated glass of the present invention is not particularly limited. The thickness of the interlayer film is preferably 0.1 mm or more, more preferably 0.25 mm or more, and preferably 3 mm or less, more preferably 1.5 mm or less, from a practical standpoint and from the viewpoint of sufficiently enhancing heat shielding properties. When the thickness of the interlayer film is equal to or more than the lower limit, a laminated glass to be obtained has high penetration resistance.

Preferably, the interlayer film for a laminated glass of the present invention includes, as two or more resin layers, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is higher than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is lower than the content B, the first resin layer tends to have a higher glass transition temperature than the second resin layer. As a result, the first resin layer is harder than the second resin layer, leading to higher penetration resistance of the interlayer film for a laminated glass.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains polyvinyl acetal X and a plasticizer, and the protective layer contains polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. The sound insulation interlayer film is more specifically described in the following.

In the sound insulation interlayer film, the sound insulation layer imparts sound insulation properties. The sound insulation layer preferably contains polyvinyl acetal X and a plasticizer.

The polyvinyl acetal X can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, a sound insulation interlayer film to be obtained can have better penetration resistance. When the polyvinyl alcohol has an average degree of polymerization of 5,000 or less, formability of a sound insulation layer can be ensured. Concerning the average degree of polymerization of the polyvinyl alcohol, the lower limit is more preferably 500 and the upper limit is more preferably 4,000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, the sound insulation layer to be obtained can stably contain a sufficient amount of a plasticizer and exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, a sound insulation layer to be obtained can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, a sound insulation layer to be obtained can have higher hydrophobicity and can contain a plasticizer in an amount needed for exhibiting sound insulation properties, and bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, a sound insulation layer to be obtained can contain a plasticizer in an amount needed for exhibiting sound insulation properties, and bleeding out of the plasticizer can be prevented. When the acetyl group content of the polyvinyl acetal X is 30 mol % or less, a sound insulation layer to be obtained can have higher hydrophobicity, thereby preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass.

The lower limit of the thickness of the sound insulation layer is preferably 50 µm. Having a thickness of 50 µm or more, the sound insulation layer can exhibit enough sound insulation properties. The lower limit of the thickness of the sound insulation layer is more preferably 80 µm. The upper limit thereof is not particularly limited. In consideration of the thickness as an interlayer film for a laminated glass, the upper limit is preferably 300 µm.

The sound insulation layer may have one end and the other end on an opposite side of the one end, and may have a shape in which the thickness of the other end is greater than the thickness of the one end. The sound insulation layer preferably has a wedge portion in a cross-sectional shape in the thickness direction. In this case, the lower limit of the minimum thickness of the sound insulation layer is preferably 50 µm. Having the minimum thickness of 50 µm or more, the sound insulation layer can exhibit enough sound insulation properties. The lower limit of the minimum thickness of the sound insulation layer is more preferably 80 µm, still more preferably 100 µm. The upper limit of the maximum thickness of the sound insulation layer is not particularly limited. The upper limit is preferably 300 µm in consideration of the thickness as an interlayer film for a laminated glass. The upper limit of the maximum thickness of the sound insulation layer is more preferably 220 µm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a higher hydroxy group content than the polyvinyl acetal X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, an interlayer film for a laminated glass to be obtained can have better penetration resistance. When the polyvinyl alcohol has an average degree of polymerization of 5,000 or less, formability of a protective layer can be ensured. Concerning the average degree of polymerization of the polyvinyl alcohol, the lower limit is more preferably 500 and the upper limit is more preferably 4,000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or less, whitening of an interlayer film for a laminated glass to be obtained can be prevented. When the polyvinyl acetal Y has a hydroxy group content of 28 mol % or more, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of the polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably lower than the plasticizer content of the sound insulation layer.

For higher sound insulation properties of a laminated glass to be obtained, the hydroxy group content of the polyvinyl acetal Y is preferably higher than the hydroxy group content of the polyvinyl acetal X, more preferably higher by 1 mol % or more, still more preferably higher by 5 mol % or more, particularly preferably higher by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content of the sound insulation layer (hereafter, also referred to as content X) based on 100 parts by mass of the polyvinyl acetal X is preferably higher than the plasticizer content of the protective layer (hereafter, also referred to as content Y) based on 100 parts by mass of the polyvinyl acetal Y, more preferably higher by 5 parts by mass or more, still more preferably higher by 15 parts by mass or more, particularly preferably higher by 20 parts by mass or more. Adjustment of the content X and content Y lowers the glass transition temperature of the sound insulation layer. As a result, a laminated glass to be obtained has still higher sound insulation properties.

The interlayer film for a laminated glass of the present invention may have one end and the other end on an opposite side of the one end. The one end and the other end are end portions on both sides facing each other in the interlayer film. In the interlayer film for a laminated glass of the present invention, the thickness of the other end is preferably greater than the thickness of the one end. A laminated glass prepared using the interlayer film for a laminated glass of the present invention having such a shape where the thickness is different between one end and the other end can be suitably used in a head-up display. In this case, occurrence of double images in the head-up display can be effectively suppressed. The interlayer film for a laminated glass of the present invention may have a wedge cross-sectional shape. Provided that the interlayer film for a laminated glass has a wedge cross-sectional shape, a head-up display can perform image display without occurrence of double images by adjusting wedge angle θ of the wedge shape according to the mounting angle of the laminated glass. The lower limit of the wedge angle θ is preferably 0.1 mrad, more preferably 0.2 mrad, still more preferably 0.3 mrad, and the upper limit thereof is preferably 1 mrad, more preferably 0.9 mrad, from the viewpoint of further suppressing the occurrence of double images. In the case of producing the interlayer film for a laminated glass having a wedge cross-sectional shape, for example, by extrusion molding of a resin composition using an extruder, the produced interlayer film may have a shape having the minimum thickness in a region slightly inward from the end on the thinner side (specifically, when the distance from one end to the other end is defined as X, a region within a distance of 0X to 0.2X inward from the end on the thinner side) and having the maximum thickness in a region slightly inward from the end on the thicker side (specifically, when the distance from one end to the other end is defined as X, a region within a distance of 0X to 0.2X inward from the end on the thicker side). Such a shape is herein also included in the wedge shape.

In the case of having a wedge-shaped cross section, the interlayer film for a laminated glass of the present invention may have a multilayer structure including a sound insulation layer and a protective layer. The cross-sectional shape of the interlayer film for a laminated glass can be adjusted to a wedge shape with a certain wedge angle by stacking the protective layer on the sound insulation layer while setting the thickness of the sound insulation layer within a certain range.

The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the thickness of the protective layer is preferably 100 μm, more preferably 300 μm, still more preferably 400 μm, particularly preferably 450 μm. The upper limit of the thickness of the protective layer is not particularly limited. For ensuring the thickness of the sound insulation layer which provides sufficient sound insulation properties, the upper limit of the thickness is practically about 500 μm.

The protective layer may have one end and the other end on an opposite side of the one end, and may have a shape in which the thickness of the other end is greater than the thickness of the one end. The protective layer preferably has a wedge portion in a cross-sectional shape in the thickness direction. The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the minimum thickness of the protective layer is preferably 100 μm, more preferably 300 μm, still more preferably 400 μm, particularly preferably 450 μm. The upper limit of the maximum thickness of the protective layer is not particularly limited. In order to ensure the thickness of the sound insulation layer enough to achieve sufficient sound insulation properties, the upper limit of the protective layer is practically about 1,000 μm, preferably 800 μm.

The sound insulation interlayer film may be produced by any method. The sound insulation interlayer film can be produced, for example, by a method of forming the sound insulation layer and protective layer as sheet materials by a conventional film-forming method such as extrusion, calendering, or pressing and then stacking the obtained sheet materials.

The present invention also encompasses a laminated glass including: a pair of glass plates; and the interlayer film for a laminated glass of the present invention interposed between the pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Moreover, also usable are organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass which enables production of a laminated glass with suppressed occurrence of optical distortion, a method for producing the interlayer film for a laminated glass, and a laminated glass produced using the interlayer film for a laminated glass.

DESCRIPTION OF EMBODIMENTS

Figure 1:
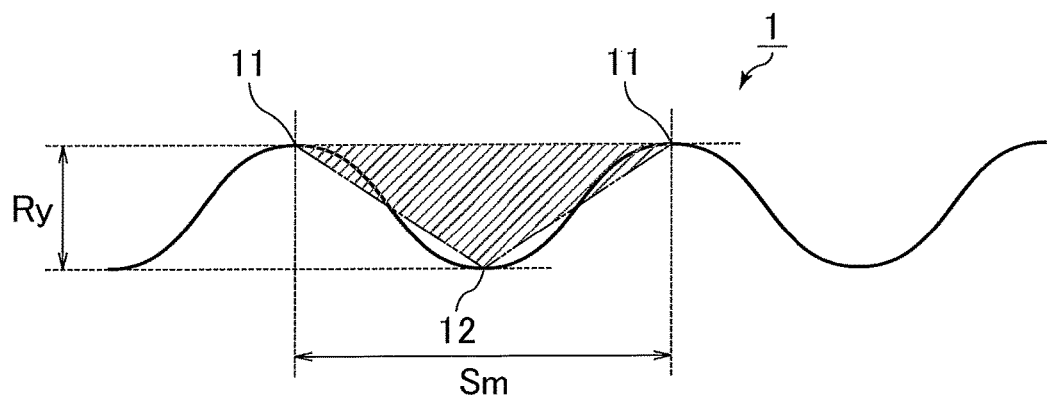
FIG. 1 shows a schematic view explaining the meaning of "(Ry×Sm)/2" in the formula (1).
Figure 2:
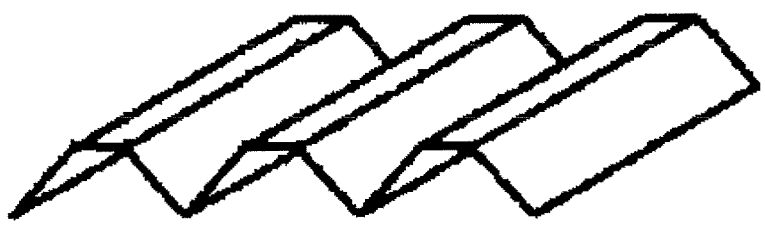
FIG. 2 shows a schematic view of an exemplary interlayer film for a laminated glass having, on a surface, recesses each having a groove shape with a continuous bottom and being adjacent and parallel to each other at equal intervals.
Figure 3:
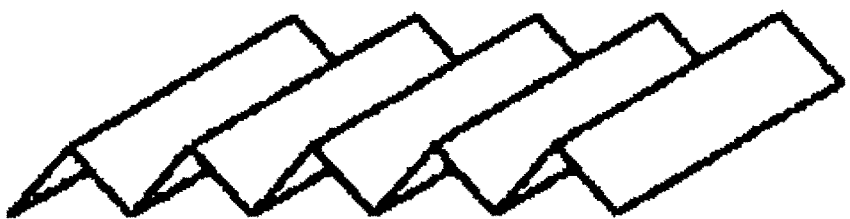
FIG. 3 shows a schematic view of an exemplary interlayer film for a laminated glass having, on a surface, recesses each having a groove shape with a continuous bottom and being adjacent and parallel to each other at equal intervals.
Figure 4:
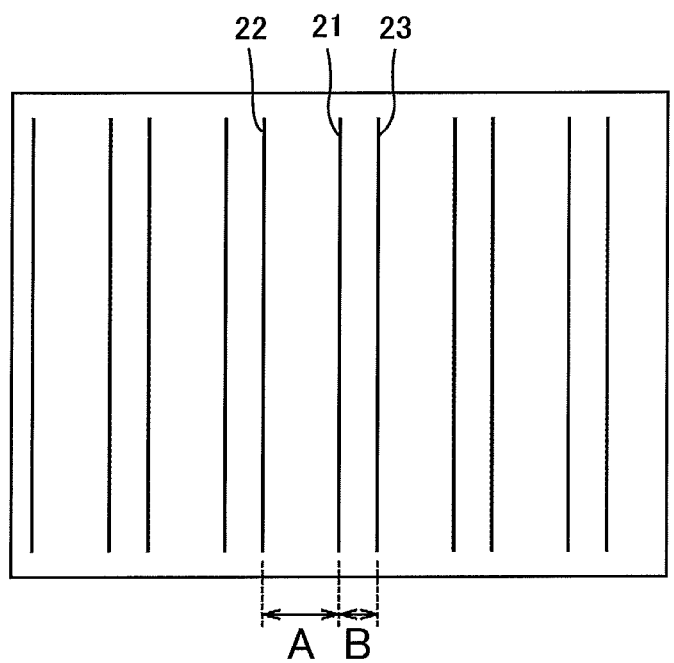
FIG. 4 shows a schematic view of an exemplary interlayer film for a laminated glass having, on a surface, recesses each having a groove shape with a continuous bottom and being adjacent and parallel to each other at unequal intervals.
Figure 5:
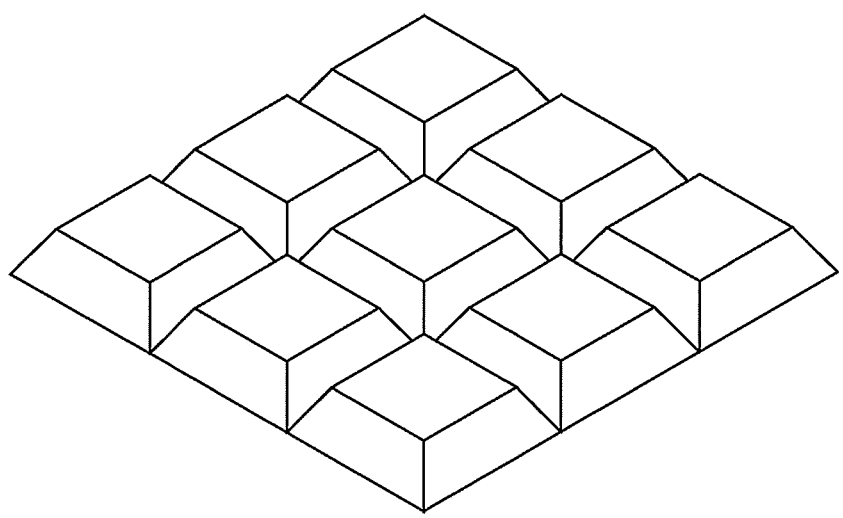
FIG. 5 shows a schematic view of an exemplary interlayer film for a laminated glass, having a blockish pattern on a surface.
Figure 6:
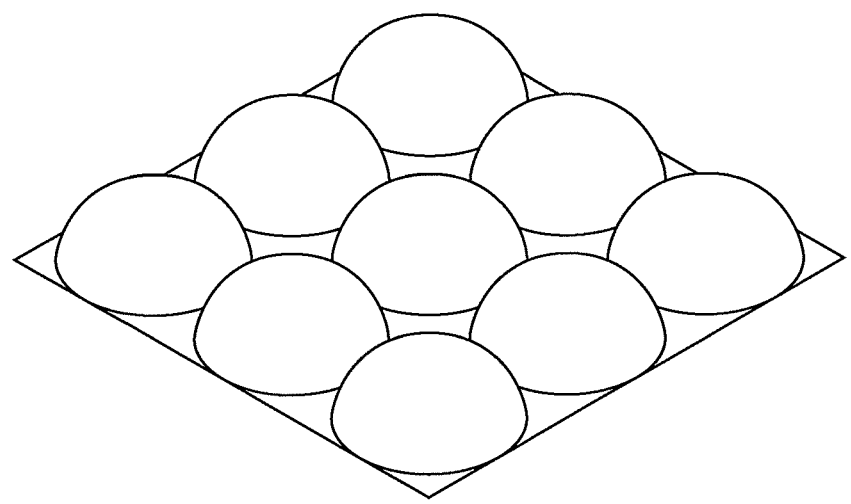
FIG. 6 shows a schematic view of an exemplary interlayer film for a laminated glass, having a spherical pattern on a surface.

Embodiments of the present invention are more specifically described in the following with reference to, but not limited to, examples.

Example 1

(1) Preparation of a Resin Composition for a Protective Layer

Polyvinyl alcohol having an average degree of polymerization of 1,700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral was added 40 parts by mass of triethylene glycol-di-2-ethylhexanoate (3GO) as a plasticizer, and the mixture was kneaded well with a mixing roll to give a resin composition for a protective layer.

(2) Preparation of a Resin Composition for a Sound Insulation Layer

Polyvinyl alcohol having an average degree of polymerization of 2,300 was acetalized with n-butyraldehyde to give polyvinyl butyral (acetyl group content: 12.5 mol %, butyral group content: 64.5 mol %, hydroxy group content: 23.0 mol %). To 100 parts by mass of the polyvinyl butyral was added 60 parts by mass of triethylene glycol-di-2-ethylhexanoate (3GO) as a plasticizer, and the mixture was kneaded well with a mixing roll to give a resin composition for a sound insulation layer.

(3) Production of an Interlayer Film for a Laminated Glass

The obtained resin composition for a protective layer and resin composition for a sound insulation layer were co-extruded from a co-extruder to form a laminate having a triple layer structure including a first surface layer (protective layer) made of the resin composition for a protective layer with a thickness of 350 μm, an intermediate layer (sound insulation layer) made of the resin composition for a sound insulation layer with a thickness of 100 μm, and a second surface layer (protective layer) made of the resin composition for a protective layer with a thickness of 350 μm stacked in the stated order. The co-extrusion conditions were set as follows to provide protrusions and recesses, concurrently with the formation of an interlayer film for a laminated glass, by an extrusion lip embossing method utilizing melt fracture.

Specifically, protrusions and recesses were formed on both surfaces of an interlayer film for a laminated glass, concurrently with the formation of the interlayer film for a laminated glass, by the extrusion lip embossing method utilizing melt fracture under the following conditions: a resin pressure at an inlet of a die of 70 kgf/cm$^2$, a resin composition temperature at the inlet of the die of 200° C., a die temperature of 210° C., a width at an outlet of the die of 1,000 mm, an extrusion amount per width of the outlet of the die of 300 kg/hr·m, a film surface temperature immediately after ejection from the die of 200° C., a distance from the outlet of the die to a cooling water tank of 170 mm, and a water temperature in the cooling water tank of 10° C. to 20° C.

The obtained interlayer film for a laminated glass had a thickness of 800 μm.

(4) Measurement of Protrusions and Recesses on a Surface (4-1) Ry Value Measurement The maximum height (Ry) on each surface of the obtained interlayer film for a laminated glass was measured by the method in conformity with JIS B-0601 (1994). The measurement was performed using "Surfcorder SE300" available from Kosaka Laboratory Ltd. as a measuring instrument under the following conditions of a stylus profilometer: a cut-off value of 2.5 mm, a standard length of 2.5 mm, an evaluation length of 12.5 mm, a tip radius of a stylus of 2 μm, a tip angle of the stylus of 60°, and a measurement rate of 0.5 mm/s. The measurement environment was set to 23° C. and 30 RH %, and the stylus was moved in a direction parallel to the machine direction of the sheet. The measurement was performed five times while the measurement point was shifted by 3 mm in the width direction for each measurement. The average of the obtained values was employed as the value of Ry. The obtained Ry values were the same on both surfaces.

(4-2) Sm Value Measurement

The average interval (Sm) of the protrusions and recesses on each surface of the obtained interlayer film for a laminated glass was measured by the method in conformity with JIS B 0601 (1994). The measurement was performed using "Surfcorder SE300" available from Kosaka Laboratory Ltd. as a measuring instrument under the following conditions of a stylus profilometer: a cut-off value of 2.5 mm, a standard length of 2.5 mm, an evaluation length of 12.5 mm, a tip radius of a stylus of 2 µm, a tip angle of the stylus of 60°, and a measurement rate of 0.5 mm/s. The measurement environment was set to 23° C. and 30 RH %, and the stylus was moved in a direction parallel to the machine direction of the sheet. The measurement was performed five times while the measurement point was shifted by 3 mm in the width direction for each measurement. The average of the obtained values was employed as the Sm value.

The obtained Sm values were the same on both surfaces.

(5) Measurement of a Degree of Shrinkage

The interlayer film for a laminated glass was cut into a rectangle (15 cm×10 cm) to be used as a measurement sample. The cutting was performed in such a manner that a side in the machine direction became a longer side of the rectangle. The measurement sample was immersed in warm water at 50° C. for 10 minutes, and water on the surface was wiped off. The resulting measurement sample was cooled to 23° C. The length in the machine direction of the measurement sample was measured, and the degree of shrinkage in the machine direction was calculated by the following equation.

Degree of shrinkage (%)={1−(length in machine direction after immersion)/(length in machine direction before immersion)}×100

Examples 2 to 8, Comparative Examples 1 to 4

An interlayer film for a laminated glass was produced, and the protrusions and recesses on the surface and the degree of shrinkage were measured in the same manner as in Example 1, except that the conditions for providing protrusions and recesses by the extrusion lip embossing method utilizing melt fracture were changed. Specifically, the conditions including the resin pressure at the inlet of the die, the resin composition temperature at the inlet of the die, the die temperature, the extrusion amount per width of the outlet of the die, the film surface temperature immediately after ejection from the outlet of the die, the distance from the outlet of the die to the cooling water tank, and the water temperature in the cooling water tank were adjusted.

(Evaluation)

The interlayer film for a laminated glass obtained in each of the examples and comparative examples was cut to a size of 15 cm in the lengthwise direction (machine direction) and 30 cm in crosswise direction. Next, a step of preliminary pressure bonding was carried out by sandwiching the cut interlayer film for a laminated glass between two transparent float glass plates (15 cm in length×30 cm in width, thickness of 2.5 mm) and then performing preliminary pressurization at 240° C. for three minutes. The obtained laminate was then pressure-bonded in an autoclave at 135° C. and 1.2 MPa for 20 minutes to be finally pressure-bonded. A laminated glass was thus obtained.

The obtained laminated glass was irradiated with light passing through a slit from a light source (halogen lamp), and distortion of the projected image on a screen was captured by a sensor (camera). The captured distortion was subjected to data processing using a computer, thereby obtaining an optical distortion value. A larger optical distortion value indicates greater optical distortion (distortion of image).

The method for measuring the optical distortion value was specifically described in the following. The optical distortion value was measured using a device disclosed in JP H07-306152 A, i.e., an optical distortion inspecting device having: a light source unit irradiating a light-transmitting object to be inspected with illumination light; a slit; a projection plane where the illumination light passing through the object to be inspected is projected; an image inputting part for generating a grayscale image by capturing the projection plane; and an image processing part for determining the presence or absence of distortion based on the variation in the gray level of the grayscale image generated by the image inputting part. Specifically, the optical distortion was evaluated by using EYE DICHO-COOL HALOGEN (15 V 100 W) produced by Iwasaki Electric Co., Ltd. as a light source, while the illuminance of the light source, the angle of the screen where optical distortion image is projected, and the angle of the camera were adjusted in such a manner that a laminated glass including a single layer film having a visible light transmittance in conformity with JIS R 3211 (1988) (value for Y under standard illuminant A, A-Y (380 to 780 nm)) of 88% ("U4100" produced by Hitachi High-Technologies Corporation was used) had an optical distortion value of 1.14 and that the optical distortion value in a state of including no glass was adjusted to 1.30. The optical distortion was evaluated under the conditions of a laminated glass temperature of 25° C. As the optical distortion value, the values in the lengthwise direction and crosswise direction can be obtained. Here, the smaller value was used as the optical distortion value. The thermometer used was a contact-type thermometer. Tables 1 and 2 show the measurement results.

With the optical distortion value of 1.24 or less, when the laminated glass is used as a windshield for vehicles, flickering of signals or pedestrian crossings does not occur.

TABLE 1

|  |  | Example 1 | Example 2 | Example 3 | Example 4 | Example 5 | Example 6 | Example 7 | Example 8 |
|---|---|---|---|---|---|---|---|---|---|
| Production condition | Resin pressure at inlet of die (kgf/cm$^2$) | 70 | 70 | 80 | 80 | 40 | 40 | 100 | 50 |
|  | Resin temperature (° C.) | 200 | 200 | 200 | 200 | 210 | 210 | 210 | 210 |
|  | Die temperature (° C.) | 210 | 200 | 190 | 190 | 200 | 200 | 200 | 210 |
|  | Width of outlet of die (mm) | 1000 | 1000 | 1000 | 1000 | 2000 | 2000 | 2000 | 2000 |
|  | Extrusion amount per width (kg/hr.m) | 300 | 300 | 300 | 300 | 250 | 250 | 250 | 250 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | Film surface temperature immediately after ejection (° C.) | 200 | 195 | 190 | 190 | 200 | 200 | 200 | 210 |
|  | Distance to cooling water tank (mm) | 170 | 200 | 100 | 200 | 100 | 200 | 100 | 100 |
|  | Water temperature in cooling water tank (° C.) | 10-20 | 15 | 15 | 15 | 15 | 15 | 20 | 15 |
| Protrusions and recesses on surface | Maximum height Ry (μm) | 14 | 17 | 22 | 23 | 12 | 10 | 21 | 30 |
|  | Average interval Sm of protrusions and recesses (μm) | 215 | 408 | 205 | 284 | 198 | 500 | 206 | 100 |
|  | (Ry × Sm)/2 | 1505 | 3468 | 2255 | 3266 | 1188 | 2500 | 2163 | 1500 |
| Degree of shrinkage in warm water at 50° C. (%) |  | 1.0 | 2.0 | 1.0 | 1.5 | 1.0 | 2.0 | 1.0 | 1.0 |
| Optical distortion value |  | 1.18 | 1.20 | 1.19 | 1.22 | 1.18 | 1.20 | 1.19 | 1.19 |

TABLE 2

|  |  | Comparative Example 1 | Comparative Example 2 | Comparative Example 3 | Comparative Example 4 |
|---|---|---|---|---|---|
| Production condition | Resin pressure at inlet of die (kgf/cm$^2$) | 300 | 300 | 90 | 90 |
|  | Resin temperature (° C.) | 200 | 180 | 200 | 190 |
|  | Die temperature (° C.) | 200 | 200 | 190 | 190 |
|  | Width of outlet of die (mm) | 2000 | 2000 | 80 | 100 |
|  | Extrusion amount per width (kg/hr · m) | 250 | 250 | 300 | 300 |
|  | Film surface temperature immediately after ejection (° C.) | 195 | 190 | 190 | 190 |
|  | Distance to cooling water tank (mm) | 200 | 100 | 250 | 250 |
|  | Water temperature in cooling water tank (° C.) | 15 | 15 | 15 | 15 |
| Protrusions and recesses on surface | Maximum height Ry (μm) | 24 | 32 | 26 | 29 |
|  | Average interval Sm of protrusions and recesses (μm) | 465 | 426 | 302 | 326 |
|  | (Ry × Sm)/2 | 5580 | 6616 | 3926 | 4727 |
| Degree of shrinkage in warm water at 50° C. (%) |  | 5.0 | 6.5 | 2.1 | 2.2 |
| Optical distortion value |  | 1.30 | 1.40 | 1.26 | 1.28 |

INDUSTRIAL APPLICABILITY

The present invention can provide an interlayer film for a laminated glass which enables production of a laminated glass with suppressed occurrence of optical distortion, a method for producing the interlayer film for a laminated glass, and a laminated glass produced using the interlayer film for a laminated glass.

REFERENCE SIGNS LIST

1: Protrusions and recesses on a surface of an interlayer film for a laminated glass
11: Protrusion
12: Recess
21: Arbitrarily selected one recess
22: Recess adjacent to the arbitrarily selected one recess
23: Recess adjacent to the arbitrarily selected one recess
A: Interval between recess 21 and recess 22
B: Interval between recess 21 and recess 23

The invention claimed is:

1. A method for producing an interlayer film for a laminated glass comprising a laminate that includes two or more resin layers in a stack and having a multitude of protrusions and recesses on at least one surface, wherein a maximum height Ry (μm) and an average interval Sm (μm) of the protrusions and recesses measured in conformity with JIS B 0601 (1994) on the surface having the multitude of protrusions and recesses satisfy the following formula (1):

$$(Ry \times Sm)/2 \leq 3,500 \qquad (1),$$

wherein the method comprises a step of providing the multitude of protrusions and recesses on at least one surface of the interlayer film for a laminated glass by an extrusion lip embossing method utilizing melt fracture, and
wherein the step includes coextrusion of resins from a co-extruder under the following conditions:
a resin pressure at an inlet of a die of 40 to 150 kgf/cm$^2$,
a resin temperature of 160° C. to 250° C.,
a die temperature of 100° C. to 270° C.,
a width of an outlet of the die of 700 to 3,500 mm,
an extrusion amount per width of the outlet of the die of 130 to 1,700 kg/hr·m,
a film surface temperature immediately after ejection from the outlet of the die of 170° C. to 250° C.,
a distance from the outlet of the die to a cooling water tank of 10 to 400 mm, and
a water temperature in the cooling water tank of 10° C. to 70° C.

* * * * *